Nov. 11, 1947.  W. R. BURGER  2,430,666
ELECTRIC SOLDERING IRON
Filed Nov. 5, 1945
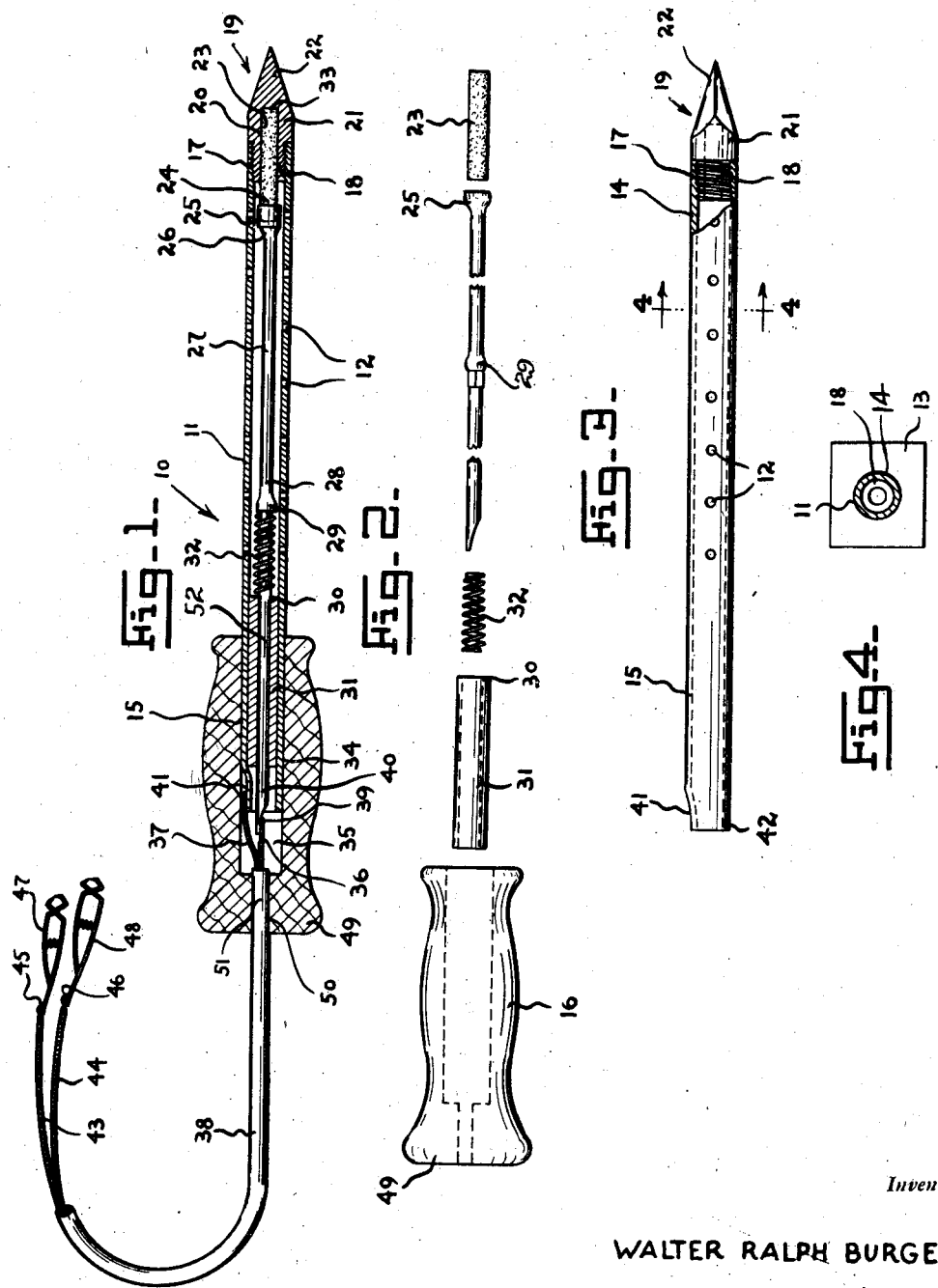
Inventor
WALTER RALPH BURGER Patented Nov. 11, 1947

2,430,666

UNITED STATES PATENT OFFICE 2,430,666

ELECTRIC SOLDERING IRON

Walter Ralph Burger, Vincennes, Ind.

Application November 5, 1945, Serial No. 626,730

1 Claim. (Cl. 219—26)

My invention as described herein, and illustrated in the accompanying drawings, consists of a soldering iron, an object of which is to provide a copper which may be brought to a white heat through either alternating or direct current supplying voltages anywhere from four to twenty-four and the current flow from ten to forty amperes.

Another object of my invention is to provide a soldering copper which may be brought to full heat in as short a time as one minute.

A further object of the invention is to provide a soldering iron having means for adjustment for different voltages.

Another object of my invention is to provide a general utility electric soldering iron so constructed as to be able to operate upon a current from any source.

Other features and advantages will become more readily apparent from the following description and the accompanying illustrative drawings in which:

Figure 1 is a longitudinal sectional view of my improved soldering iron,

Figure 2 is a plan view showing certain of the elements separated,

Figure 3 is a broken elevational view of certain other elements of the device, and Figure 4 is a sectional view on line 4—4 of Figure 3, and including a modification.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claim. And while I have stated the primary field of utility of my invention it remains obvious that it may be employed in any other capacity wherein it may be found applicable.

In the accompanying drawings, and in the following specification, the same reference characters are used to designate the same parts and elements throughout and in which 10, refers to my invention and 11, indicates a conductor tube forming a housing and operating shank provided with a series of air vents 12, and a heat baffle 13, adjacent its end 14. The shank 11, at its end 15, is provided with an insulator handle 16, and the terminal 17, of the shank is internally screw-threaded to receive the reduced threaded end 18, of a copper soldering tip 19.

The tip 19, is provided with a bore 20, extending through its threaded shank 18, through the body 21, and adjacent the soldering tip 22, into which bore is seated a carbon electrode 23. Upon the outer end 24, of said electrode is seated a cap 25, formed on the outer end 26, of a slender conductor rod 27, to an intermediate portion 28, of which is an integral flange 29, between which and the end 30, of an insulated tube 31, seats a spring 32, which acts to hold the rod and its cap pressed down upon the electrode 23, thus keeping the terminal 33, thereof into close contact with the point 22, of said copper.

The end 15, of the housing shank extends into bore 34, of the handle 11, leaving portion 35, of the bore open to receive the inner ends 36 and 37, of the conductor wires freed from the insulator wrapping of the conductor extension cord 38. The wire 36, is connected at 39, to the outer terminal 40, of the conductor 27, while the wire 27, is connected into the depression 41, formed in the outer terminal 42, of end 15, of said member 11. The ends 43 and 44, of the wires 36 and 37, are branched and insulated and the terminals 45 and 46, of which are connected to spring clips 47 and 48, for connecting with battery posts or with other source of current supply. The end 49, of the handle 16, is provided with a bore 50, in which end 51, of cord 38, is secured. The portion 52, of the conductor rod 27, extends entirely through the insulator tube 31, which tube is also a centering means which with cap 25, being supported on the end 24, of the electrode, provides means for the complete centering axially the said rod 27, within the shank tube 11, whereby the tube and rod are insulated relative to one another. The electrical circuit from the cord 38, extends through rod 27, to the soldering copper 21, and thence back through the tube 11, to the cord.

The experimental working model of the above described device has been in actual use for more than a year and has proven efficient in every respect and in connection with every source of electrical supply as herein stated. Its use saves at least a half an hour in heating time over all other electric soldering irons found and its heat can be controlled through connection with one, two, or three battery cells when operating from a standard automobile battery and will operate from a battery for half an hour at full heat without making any noticeable discharge therefrom. Though simple in construction and inexpensive to make, with no delicate parts to get out of order, it has proven very durable and through long and varied use has shown no sign of depreciation.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

A soldering iron comprising an outer tubular conductor, an inner solid conductor having a cup on one end thereof, a cylindrical electrode terminally secured in said cup, a copper head secured to one end of said outer conductor and apertured to receive said electrode, and a coil spring to bias said solid conductor in one direction maintaining said cup, electrode and copper head in electrical contact, a block of insulative material in the other end of said outer conductor, a boss on said solid conductor intermediate the ends thereof, said spring being compressed between said boss and said block, electric leads secured to said solid conductor and to said outer conductor, said other end of the outer conductor having an indent wherein an end of one of said leads is secured, said indent coacting with said block to retain said block within said outer conductor.

WALTER RALPH BURGER.

REFERENCES CITED

The following references are of record in the file of this patent:

UNITED STATES PATENTS

| Number | Name | Date |
|---|---|---|
| 1,463,951 | Groven | Nov. 12, 1920 |
| 1,491,389 | Frykman | July 11, 1921 |